(12) United States Patent
Mere et al.

(10) Patent No.: US 9,254,910 B2
(45) Date of Patent: Feb. 9, 2016

(54) METHOD AND DEVICE FOR ASSISTING THE MISSION TRACKING OF AN AIRCRAFT

(71) Applicant: AIRBUS OPERATIONS (SAS), Toulouse (FR)

(72) Inventors: Jean-Claude Mere, Verfeil (FR); Olivier Babando, Toulouse (FR); Mauro Marinelli, Toulouse (FR); Julien Dramet, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 56 days.

(21) Appl. No.: 13/910,372

(22) Filed: Jun. 5, 2013

(65) Prior Publication Data
US 2014/0005861 A1 Jan. 2, 2014

(30) Foreign Application Priority Data
Jun. 5, 2012 (FR) ..................................... 12 55219

(51) Int. Cl.
*B64C 19/00* (2006.01)
*G08G 5/00* (2006.01)

(52) U.S. Cl.
CPC .............. *B64C 19/00* (2013.01); *G08G 5/0039* (2013.01); *G08G 5/0052* (2013.01)

(58) Field of Classification Search
CPC .... G08G 5/0039; G08G 5/0052; B64C 19/00; B64D 43/00; G07C 5/0841; G07C 5/085
USPC ................................................ 701/3, 14, 123
See application file for complete search history.

(56) References Cited

U.S. PATENT DOCUMENTS

| | | | |
|---|---|---|---|
| 8,694,234 B2* | 4/2014 | Mere et al. ..................... 701/123 |
| 2005/0192717 A1* | 9/2005 | Tafs et al. ......................... 701/3 |
| 2007/0150178 A1 | 6/2007 | Fortier | |
| 2008/0125930 A1* | 5/2008 | Johnson .......................... 701/29 |

FOREIGN PATENT DOCUMENTS

FR 2 894 705 6/2007

OTHER PUBLICATIONS

Search Report for FR 12 55219 dated Mar. 8, 2013.

* cited by examiner

*Primary Examiner* — John Q Nguyen
*Assistant Examiner* — Nadeem Odeh
(74) *Attorney, Agent, or Firm* — Nixon & Vanderhye P.C.

(57) ABSTRACT

The device (1) comprises means (15) for computing deviations of a flight parameter with respect to a reference flight plan, by taking account of predictions, respectively for a plurality of flight data representing different origins, and display means (5) for simultaneously presenting the set of said deviations on a screen (6) of the flight deck of the aircraft, each time indicating the corresponding origin.

14 Claims, 2 Drawing Sheets

METHOD AND DEVICE FOR ASSISTING THE MISSION TRACKING OF AN AIRCRAFT

This application claims priority to FR 12 55219 filed 5 Jun. 2012, the entire contents of which is hereby incorporated by reference.

BACKGROUND OF THE INVENTION

The present invention relates to a method and a device for assisting the mission tracking of an aircraft, in particular of a transport airplane.

The invention relates more particularly to the tracking (by the crew of the aircraft) of the evolution of essential parameters of the aircraft so as to track the progress of a mission (or flight) under way, and verify whether it remains in accordance with a reference mission delineated by a flight plan computed on the ground, by taking account of forecasts of flight conditions available on the date of its establishment and loaded into the aircraft in electronic form.

DESCRIPTION OF THE PRIOR ART

In particular, it is known that the standard operational procedures ask the crew of an aircraft to perform a verification of consistency:
on the one hand, between the actual quantity of fuel measured on the onboard instruments at each turning point of the flight plan (or at regular time intervals) and the quantity envisaged at the level of a reference flight plan (relating to a reference mission); and
on the other hand, between the transit time read on the watch at each turning point of the flight plan and that envisaged by the reference flight plan.

Concerning the verification of the quantity of fuel available, at each turning point, flight preparation software has computed the estimate of remaining quantity of fuel available in the aircraft. The procedure requires the crew to compare this predicted quantity of fuel with the quantity of fuel measured (read off on the ECAM) by noting it under that predicted.

In case of deviation, the operational procedures ask the crew to perform several types of tests (verification of the state of the systems of the aircraft: engine air bleed, slat and flaps, landing gear with respect to what was envisaged, verification of the trajectory and of the winds taken into account, computation of the sum of the quantity of fuel consumed and that remaining available and comparison with the quantity of fuel loaded aboard before the flight, etc.) so as to identify the source of the observed deviation.

In the case where the deviation is related to a trajectory modification, to a difference of the state of systems of the aircraft or of the conditions (wind, temperature, etc.) encountered, the crew relies on the documentation available in the aircraft (of paper type or of electronic type) to re-evaluate the quantity of fuel necessary for the progress of the flight up to destination, having regard to the actual state of the aircraft and/or the conditions encountered, and to update the residual quantity of fuel at destination.

In the case of a fuel leak (sum of the quantity of fuel consumed and that available different from the quantity of fuel loaded aboard before the flight), the crew must very regularly re-evaluate the residual quantity of fuel at destination in the same way as previously, but each time taking into account the updated value of the quantity of fuel actually available on board, so as to ensure that it still has enough fuel to arrive at destination.

Furthermore, if the straying is not due to either of the two previous causes, the aircraft undergoes a degradation (aerodynamic, engine, etc.) with respect to the theoretical model which makes it possible to compute the predictions in terms of quantity of fuel and time estimated along the flight plan. In this case, the crew estimates a conservative performance factor which can be input into the flight management system to adjust the theoretical performance model used by the latter (degrade it) so as to obtain predictions that are closer to reality. This estimation can be carried out, either on the basis of the documentation available in the aircraft (paper or electronic) if the crew knows the degradation affecting the aircraft, or manually (by estimating the fuel difference noted and by computing the ratio of estimated fuel difference to quantity of fuel consumed).

The aforementioned routine operations, relating to the mission tracking task, present drawbacks. In particular:
the operational procedures are based on essentially manual operations, thus giving rise to a workload for the crew;
the crew can only have knowledge of an anomaly during a manual verification;
upon detection of an anomaly, the crew does not know the trend of the straying and must wait for the following manual measurements;
the management of the anomalies related to a degradation of the aircraft or of an engine relies on recommendations in the documentation only for certain well-identified faults. For the other faults, manual verifications and computations (and estimations), which result in a workload for the crew, must be undertaken; and
if the flight conditions are modified with respect to the initial flight plan, the crew no longer has a reference flight plan aboard, thus preventing them from making a relevant comparison for two instants of the flight.

SUMMARY OF THE INVENTION

The object of the present invention is to remedy these drawbacks and to aid the crew in such situations requiring in particular a considerable workload. It relates to an automatic method for assisting the mission tracking of an aircraft, in particular of a transport airplane.

For this purpose, said method is noteworthy according to the invention in that, in the course of a flight of the aircraft, in an automatic manner:
the actual values of parameters (for example the speed, the temperature, the altitude, etc.) relating to said aircraft are measured;
for at least one flight parameter (for example the quantity of fuel), deviations of said flight parameter with respect to a reference flight plan relating to a reference mission are computed, doing so by carrying out, for each of a plurality of flight data representing respectively different origins of deviations, each time the following operations:
a prediction is carried out at the current flight point of said flight parameter, on the basis of the flight plan actually flown, taking account of said measured actual values; and
the deviation is computed between this prediction obtained on the basis of the flight plan actually flown and the value of said flight parameter that is representative of said reference flight plan, this deviation thus computed being a deviation of said flight parameter relating to the corresponding origin; and
the set of deviations thus computed for said flight parameter is presented simultaneously on a screen of the flight deck of the aircraft, each time indicating the corresponding origin (for example a performance degradation or a leak for the quantity of fuel).

Thus, by virtue of the invention, automatic processings are carried out and the crew are automatically provided with the information relevant to the tracking of the mission, as specified further hereinbelow, thereby making it possible in particular to reduce the workload of the crew.

More particularly, the set of origins of deviations, that is to say the set of causes or sources at the origin of deviations of a flight parameter with respect to a reference flight plan, is presented to the crew, thereby providing the crew with a relevant item of information affording them an exhaustive overview of the origin and of the value of the various deviations of this flight parameter and enabling them to implement if appropriate the necessary (in particular corrective) operations.

Preferably, although not exclusively, said flight parameter represents one of the following parameters:
the quantity of fuel at a given point; and
the transit time at a given point.

Moreover, advantageously, the flight data able to be at the origin of different deviations of a flight parameter, may comprise at least some of the following data:
the speed;
the wind;
the temperature;
the altitude;
the route.

Moreover, advantageously, for a flight parameter representing the quantity of fuel, the following operations are carried out:
a consumption prediction is carried out at the current point of the flight on the basis of the flight plan actually flown, by taking account of the evolution of a performance factor and of the flight conditions actually encountered;
the deviation in consumption is computed at the current point between on the one hand said consumption prediction obtained on the basis of the flight plan actually flown and on the other hand the consumption arising from the reference flight plan; and
processings dependent on the value of this consumption deviation are implemented.

In this case, in an advantageous manner, the deviation is determined, moreover, between the consumption predicted at said current point and the measured consumption, which deviation corresponds to a deviation with indeterminate origin.

Moreover, advantageously:
at the start of a mission, an input initial flight plan is compared automatically with said reference flight plan; and/or
in the course of a mission, the reference flight plan is automatically replaced with a current flight plan, if particular conditions are fulfilled (in particular when the current flight plan deviates too far from said reference flight plan).

Furthermore, in an advantageous manner, at least one alert message (preferably of visual type) is emitted, when at least one flight parameter exhibits a drift greater than a threshold value, between on the one hand the current flight plan and on the other hand the reference flight plan.

In a preferred embodiment, at least one graphic is displayed, moreover, in the flight deck, simultaneously illustrating the following evolutions of a flight parameter:
the actual evolution up to the current position, and then the predicted evolution, along an active flight plan;
the evolution along the reference flight plan; and
at least one limit; and optionally
the evolution along an alternative flight plan.

Preferably, several graphics such as that aforementioned, relating respectively to various flight parameters, are displayed on said screen simultaneously.

As specified hereinbelow, the present invention makes it possible to bundle together and summarize automatically the information needed by the crew in order to ensure that the flight parameters evolve nominally, to identify a possible straying in the evolution of one or more of these flight parameters, to isolate the source or sources of this straying, and to determine the relative importance of each source so that the crew can implement a suitable corrective action or actions.

The present invention makes it possible at one and the same time to facilitate the mission tracking operations (carried out in a manual manner currently) and to improve them by providing novel automatic means for detecting potential sources of a drift (in particular of fuel consumption) and by allowing the crew to know what is the relative share of each source in the detected drift.

The lengthy and irksome verifications required by the routine operational procedures in case of anomaly detection, are thus advantageously replaced with a reading and a direct interpretation of curves exhibiting the evolution (past, envisaged and actual) of the parameters essential for the tracking of the mission.

The present invention also relates to an automatic device for assisting the mission tracking of an aircraft.

According to the invention, said device comprises:
means for retrieving and processing a reference flight plan relating to a reference mission;
means for measuring the actual values of parameters relating to the aircraft, in the course of a flight of said aircraft;
computation means for computing, for at least one flight parameter (for example the quantity of fuel), deviations of said flight parameter with respect to a reference flight plan relating to a reference mission, said computation means comprising elements for carrying out, for each of a plurality of flight data representing respectively different origins (or sources) of deviations, each time the following operations:
carrying out a prediction at the current flight point of said flight parameter, on the basis of the flight plan actually flown, taking account of measured actual values; and
computing the deviation between this prediction obtained on the basis of the flight plan actually flown and the value of said flight parameter that is representative of said reference flight plan, this deviation thus computed being a deviation of said flight parameter relating to the corresponding origin; and
display means for presenting on a screen of the flight deck of the aircraft, simultaneously the set of deviations thus computed for said flight parameter, each time indicating the corresponding origin (for example a performance degradation for the quantity of fuel).

Furthermore, advantageously, said device comprises, moreover:
means for retrieving and processing an active flight plan and an alternative flight plan;
means for retrieving and processing data of computation modules; and/or
means for managing alerts.

The device in accordance with the present invention makes it possible, in particular, to provide the crew automatically with a graphical representation of the past, present and predicted evolution of various flight parameters, to detect a drift of some of these flight parameters with respect to their evolution envisaged in a reference mission, and to indicate the origins of this drift and the relative contribution of each origin to the overall value of the drift.

The present invention relates, furthermore, to an aircraft and in particular a transport airplane, which is equipped with a device for assisting mission tracking, such as aforementioned.

DESCRIPTION OF THE DRAWINGS

The figures of the appended drawing will elucidate the manner in which the invention may be embodied. In these figures, identical references designate similar elements.

DESCRIPTION OF THE PREFERRED EMBODIMENTS

Figure 1:
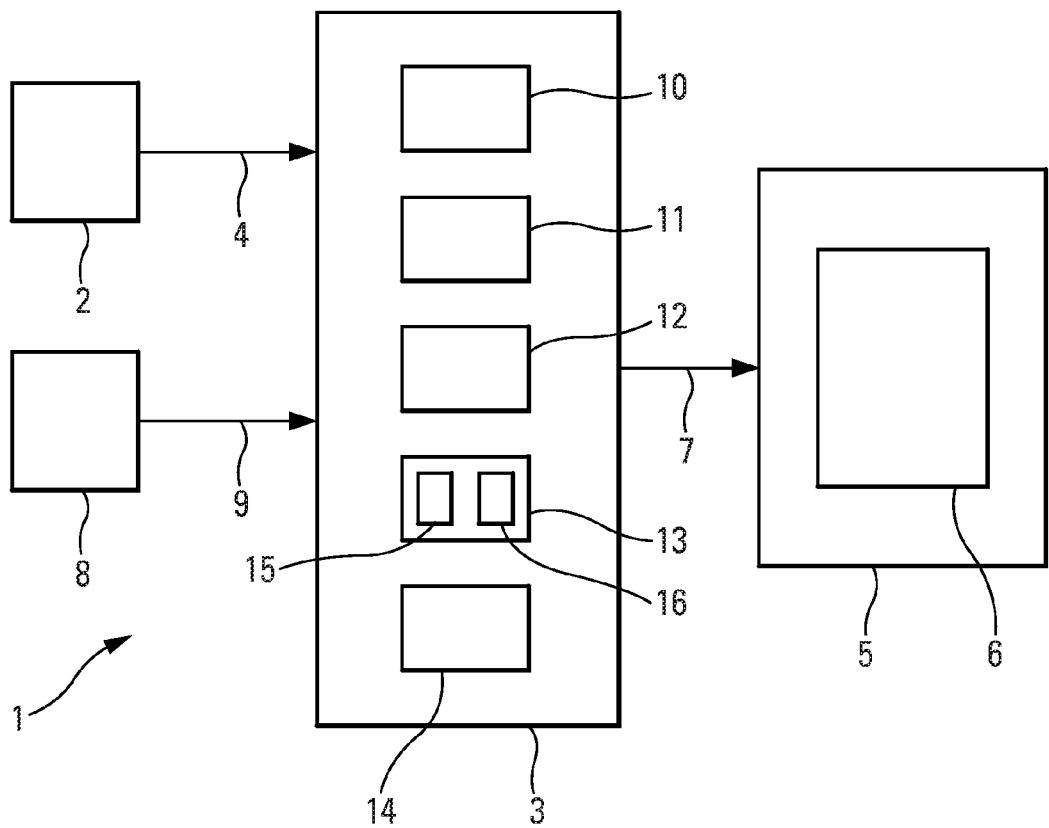
FIG. 1 is the schematic diagram of a device in accordance with the invention.

The device 1 in accordance with the invention and represented schematically in FIG. 1 is an automatic device for assisting the mission tracking of an aircraft, not represented, in particular of a transport airplane.

Accordingly, said device 1 which is onboard the aircraft, is of the type comprising:
a set 2 of information sources, which are able to measure the current values of parameters of the aircraft, in the course of a flight of said aircraft;
a central unit 3 which is connected by way of a link 4 to said set 2 of information sources and which is able to implement a plurality of functions specified hereinafter; and
display means 5 which comprise at least one screen 6 and which are connected by way of a link 7 to said central unit 3.

Said device 1 also comprises man/machine interface means 8 which are connected by way of a link 9 to said central unit 3 and which allow a crew member to input data into the device 1.

According to the invention, said central unit 3 comprises the following means, specified hereinafter:
means 10 for retrieving data relating to a reference flight plan representative of a reference mission (or flight). By way of illustration, a reference mission (or flight) can comprise, in a routine manner, various successive flight phases and in particular a takeoff phase, a climb phase, a cruising flight phase (according to one or more flight levels), and an approach and landing phase;
means 11 for processing and retrieving data relating to the active flight plan and to an alternative flight plan;
means 12 for processing and retrieving the current conditions, which may in particular be connected to the set 2;
means 13 for processing and retrieving the data arising from computation modules (specified hereinbelow); and
means 14 for managing alerts.

To implement an essential function of the invention, said device 1 comprises:
means 15 which form for example part of said means 13 and which compute for at least one flight parameter (for example the quantity of fuel), deviations of said flight parameter with respect to a reference flight plan relating to a reference mission. Said means 15 comprise integrated elements (not represented specifically) for carrying out, for each of a plurality of flight data representing respectively different origins (or sources) of deviations, each time the following operations:
carrying out a prediction at the current flight point of said flight parameter, on the basis of the flight plan actually flown, taking account of measured actual values; and
computing the deviation between this prediction obtained on the basis of the flight plan actually flown and the value of said flight parameter that is representative of said reference flight plan, this deviation thus computed being a deviation of said flight parameter relating to the corresponding origin; and
said display means 5 which present the set of said deviations (received from the means 15) on said screen 6 of the flight deck of the aircraft, each time indicating the corresponding origin, as specified hereinbelow with reference to FIGS. 2 and 3.

Thus, the device 1 in accordance with the invention carries out automatic processings, and it automatically provides the crew with the information relevant to the tracking of the mission, as specified further hereinbelow, thereby making it possible in particular to reduce the workload of the crew.

Moreover, said device 1 presents to the crew the set of origins of deviations, that is to say the set of causes or sources at the origin of deviations of a flight parameter (for example the quantity of fuel) with respect to said reference flight plan, thereby affording the crew an exhaustive overview of the origin and of the value of the deviations of this flight parameter in order in particular to be able if appropriate to implement corrective operations.

Within the framework of the present invention, the comparisons are carried out between parameters relating on the one hand to a flight plan (current) actually flown and on the other hand to a reference flight plan used, this reference flight plan being able to correspond to the reference flight plan arising from the preparation of the mission or to a new reference flight plan defined in the course of the flight and corresponding for example to a frozen active flight plan, as specified hereinbelow.

Preferably, although not exclusively, said flight parameter represents one of the following parameters:
the quantity of fuel at a given point in the course of the flight; and
the transit time at a given point in the course of the flight.

For a flight parameter representing the quantity of fuel, said means 15 carry out the following operations, as specified hereinbelow:
they carry out a prediction of consumption at the current point of the flight on the basis of the flight plan actually flown by taking account of the evolution of a performance factor and of the flight conditions actually encountered;
they determine the deviation between the consumption predicted at said current point and the measured consumption, which corresponds to a deviation with indeterminate origin; and
they determine the deviation in consumption at the current point between the consumption prediction obtained on the basis of the flight plan actually flown and taking account of the flight and performance conditions encountered, and that arising from the reference flight plan. Different processings are thereafter implemented as a function of the value of this consumption deviation.

Moreover, the device 1 also carries out the following operations:
at the start of a mission, it automatically compares an input initial flight plan with said reference flight plan; and in the course of a mission, it automatically replaces the reference flight plan with a current flight plan in the case of considerable divergence, after an action of the pilot.

The means 10 carry out a retrieval of data relating to a reference flight plan representative of a reference mission (or flight). The reference flight plan arising from the mission preparation is loaded into the aircraft, either in an open world application, or in an avionics system so as to serve as reference during the flight. The means 10, in which this flight plan is stored, are charged with retrieving the information useful to the mission tracking task for the display means 5 so that they can format them and present them to the crew.

The means 10 are also in charge of storing the data relating to the current active flight plan, when the crew decides to freeze it and to use it as new reference subsequent to a considerable modification of the initial reference flight plan, which renders the latter obsolete. The frozen active flight plan then takes the place of the reference flight plan so as to allow the crew to continue their mission tracking task in an effective manner until the end of the flight.

Moreover, the means 11 carry out a processing and a retrieval of data relating to the active flight plan and to an alternative flight plan. These means 11 are charged with providing the display means 5 with the data useful to the mission tracking task corresponding to the active flight plan of the flight management system.

The means 11 also provide the display means 5 with the data useful to the mission tracking task corresponding to an alternative flight plan, when the active flight plan is amended in a temporary manner (before the activation of the modifications performed on the active flight plan).

These means 11 provide not only the current and predicted data, but also a log of these data which have been recorded throughout the flight. This recording is carried out at predefined time steps or during any event related to the flight plan (overflying of a waypoint, modification of the flight plan, etc.).

The parameters transmitted are of two types:

A/ overall data on the flight, and in particular:
an estimate of the quantity of fuel at destination;
an estimate of the time of arrival at destination;
a performance factor such as defined in the flight management system;
a performance factor measured by a real-time estimator; and
the sum of the quantity of fuel consumed and of the quantity of fuel remaining available in the aircraft.

These values are stored throughout the flight, at each overflight of a point or regularly (in terms of time or distance along the flight plan). The current value of each of the parameters is stored in memory so as to supply a data table which is transmitted to the display means 5 so as to represent the evolution of the parameter considered. This table is therefore filled in progressively during the flight; and B/ current data of the flight plans, and in particular:
an estimate of transit time at each point;
an estimate of the quantity of fuel available at each point;
the sum of the quantity of fuel consumed and of the quantity of fuel available at each point;
the distance remaining to be traversed at each point (between two points, the function must compute the distance remaining between the current position of the aircraft and the destination);
the altitude at each point;
the speed at each point (expressed as Mach number, as CAS, as ground speed);
the wind forecast at each point (projected along the axis of the flight plan) and computed as a function of the forecast adjusted with the measured current value;
the temperature at each point (interpolation of the values input by the crew); and
the identifier of each element of the flight plan ("waypoints" and "pseudo-waypoints").

These parameters are those computed by the flight management system on the active flight plan, and optionally on an alternative flight plan subsequent to a temporary modification of the active flight plan, either on action of the crew (via the means 8), or in an automatic manner by a decision aid module. These parameters are permanently updated. The set of values computed for a parameter on the complete flight plan is stored in a table. As soon as an element of the flight plan is sequenced, the predicted value is overwritten in the table with the value measured at the instant of the sequencing so that the table represents the actual values of the parameter on the already sequenced points and the predicted values of this parameter on the forthcoming points. In the case of modification of the flight plan, only the predicted values are updated.

Moreover, the means 12 carry out a processing and a retrieval of current conditions. These means 12 provide various data relating to the current performance of the aircraft as well as to the environment: maximum and/or minimum level attainable in the course of the flight, maximum and/or minimum speed, current wind, current temperature, measured speed, measured altitude, quantity of fuel on board, etc. All the useful flight parameters which result from the current state of the aircraft and its environment are thus recovered and stored, and then transmitted to the display means 5.

Moreover, the means 13 are in charge of centralizing and acquiring the information arising from diverse computation modules. These modules carry out computations related to the performance of the aircraft and to its environment.

Preferably, the means 13 comprise in particular the following computation modules:
said means 15 which will be specified hereinafter and which represent a module for analyzing the causes of a drift in particular of the fuel consumption; and
means 16 of real-time estimation of the performance state of the aircraft.

These means 16 compute a performance factor on the basis of information measured by various sensors of the aircraft (sensors of fuel flowrate in particular) that the crew can compare with the performance factor used by the flight management system to compute the predictions along the flight plan. In the case of significant difference, the value computed by the module allows the crew to adjust the aircraft performance model so as to recover computed predictions at each point of the flight plan, which are consistent with the actual state of the aircraft and the reality of the flight.

Moreover, the function of the means 14 for managing alerts is to automatically alert the crew of an unexpected straying of one or more parameters. Various alerts can be triggered at several levels, according to the parameters:
value crossing a predetermined threshold;
value straying from the reference beyond a predetermined threshold (percentage or value input by the crew);
divergent trend in relation to reference values; and
specific alert originating from a computation module.

Preferably, the means 14 generate a visual alert, via a display, preferably at the level of the displays carried out in accordance with the invention on the screen 6. The means 14 transmit for this purpose various items of information destined for the display means 5: messages of alerts to be displayed, parameters to be highlighted in the list of parameters to be displayed, etc.

It is also conceivable that the means 14 generate an alert of sound type in the flight deck.

Moreover, the display means 5 collect the set of data originating from the other functions (real-time estimator, functions for retrieving the data relating to the reference and active flight plans) of the device 1, and they carry out the shaping of the various curves representing the parameters to be monitored, the management of the display and the display of these curves.

These display means 5 are also in charge of adapting the viewing to the nature of the data, as well as to selections of the crew. To this end, the various graphics can represent the data in an absolute manner or in relation to the reference data, over the whole of the flight or over a portion of the latter, doing so according to a linear scale in time or in distance (traversed, remaining).

Moreover, said means 15 carry out an analysis of the causes of a drift of the fuel consumption.

With the aid of the onboard performance model, of the actual evolution of a performance factor computed by the means 16 and of the actual evolution of the flight parameters up to the current point of the mission, the means 15 highlight the various events that have arisen in the course of the flight and have had an influence on the evolution of the objectives of the mission. The crew then has a summary overview of these events and of their impacts.

The flight data at the origin of the cases of over/under consumption are considered to be of three kinds:
degradation in performance;
non-verification of the assumptions that served for the computation of the reference flight plan (modification of the altitude, speed, wind, temperature, trajectory, performance); and
fuel leak.

The means 15 assign to each of the sources of drift in consumption, a relative weight which is expressed as a percentage of the total over/under consumption.

The prediction of consumption at the current point of the flight is firstly computed on the basis of the flight plan actually flown (altitude, speed, distance traversed, etc.) while taking account of the evolution of the performance factor computed by the means 16, and of the flight conditions actually encountered (wind, temperature) in the course of the mission (Pred$_{actual}$). The deviation obtained between the consumption thus predicted at the current point and that measured, is denoted $\Delta FOB_{unk}$.

This deviation corresponds to an indeterminate fuel deviation, the most probable causes of which are a measurement error (nonlinear dynamics of the fuel gauges) or a fuel leak.

Thereafter, the means 15 determine the deviation in consumption at the current point between the prediction obtained on the basis of the flight plan actually flown and taking account of the flight and performance conditions encountered (the same as previously: Pred$_{actual}$) and that arising from the reference flight plan. This deviation is denoted $\Delta FOB$.

Depending on whether the value of this deviation $\Delta FOB$ is low or significant, various processings are envisaged.

The means 15 analyze one by one the atmospheric conditions and the flight conditions (for example the wind, the speed, the temperature, the altitude, the lateral modifications of trajectory, the degradation in performance of the airframe of the aircraft, etc.) actually encountered (data available by virtue of the means 11) with respect to those envisaged, and they identify, in the case of significant difference, as many parameters liable to be a source of an increase or of a decrease in consumption. These parameters may be different, depending on the progress of the flight.

The means 15 isolate each of these potential sources (represented by one of the aforementioned parameters) of deviations and evaluate its impact on the prediction of consumption at the current point having regard to the conditions actually encountered (Pred$_{actual}$).

Accordingly, the means 15 perform the computation of predictions at the current point by considering the flight plan actually flown (if the trajectory is not the isolated source), as well as the evolution of the performance factor (if an isolated parameter is not involved), and the flight conditions actually encountered in the course of the mission (with the exception of those that may possibly be isolated).

For each parameter thus isolated, the means 15 then subtract from Pred$_{actual}$ the predictions computed in the absence of any change of this parameter.

We then obtain for example: $\Delta FOB_{spd}$, $\Delta FOB_{temp}$, $\Delta FOB_{alt}$, $\Delta FOB_{wind}$, $\Delta FOB_{lat}$ and $\Delta FOB_{perf}$ (other parameters and therefore other sources of fuel deviation can be taken into account, depending on the progress of the flight).

Two typical cases can arise:

A/ $\Delta FOB$ exhibits a significant value (negative or positive).

Although $\Delta FOB$ is different from the sum of the various contributions obtained, a summary overview of the various consumption entries can be provided to the crew by computing the following data:

$$\% FOB_{spd} = \frac{100 \times \Delta FOB_{spd}}{\Delta FOB_{spd} + \Delta FOB_{temp} + \Delta FOB_{alt} + \Delta FOB_{wind} + \Delta FOB_{lat} + \Delta FOB_{perf}} \times \frac{\Delta FOB}{\Delta FOB + \Delta FOB_{unk}}$$

$$\% FOB_{temp} = \frac{100 \times \Delta FOB_{temp}}{\Delta FOB_{spd} + \Delta FOB_{temp} + \Delta FOB_{alt} + \Delta FOB_{wind} + \Delta FOB_{lat} + \Delta FOB_{perf}} \times \frac{\Delta FOB}{\Delta FOB + \Delta FOB_{unk}}$$

$$\% FOB_{alt} = \frac{100 \times \Delta FOB_{alt}}{\Delta FOB_{spd} + \Delta FOB_{temp} + \Delta FOB_{alt} + \Delta FOB_{wind} + \Delta FOB_{lat} + \Delta FOB_{perf}} \times \frac{\Delta FOB}{\Delta FOB + \Delta FOB_{unk}}$$

$$\% FOB_{wind} = \frac{100 \times \Delta FOB_{wind}}{\Delta FOB_{spd} + \Delta FOB_{temp} + \Delta FOB_{alt} + \Delta FOB_{wind} + \Delta FOB_{lat} + \Delta FOB_{perf}} \times \frac{\Delta FOB}{\Delta FOB + \Delta FOB_{unk}}$$

$$\% FOB_{lat} = \frac{100 \times \Delta FOB_{lat}}{\Delta FOB_{spd} + \Delta FOB_{temp} + \Delta FOB_{alt} + \Delta FOB_{wind} + \Delta FOB_{lat} + \Delta FOB_{perf}} \times \frac{\Delta FOB}{\Delta FOB + \Delta FOB_{unk}}$$

$$\% FOB_{perf} = \frac{100 \times \Delta FOB_{perf}}{\Delta FOB_{spd} + \Delta FOB_{temp} + \Delta FOB_{alt} + \Delta FOB_{wind} + \Delta FOB_{lat} + \Delta FOB_{perf}} \times \frac{\Delta FOB}{\Delta FOB + \Delta FOB_{unk}}$$

Also, $\Delta FOB_{unk}$ is expressed as a percentage of $\Delta FOB$:

$$\% FOB_{unk} = 100 \times \frac{\Delta FOB_{unk}}{\Delta FOB + \Delta FOB_{unk}}$$

Figure 2:
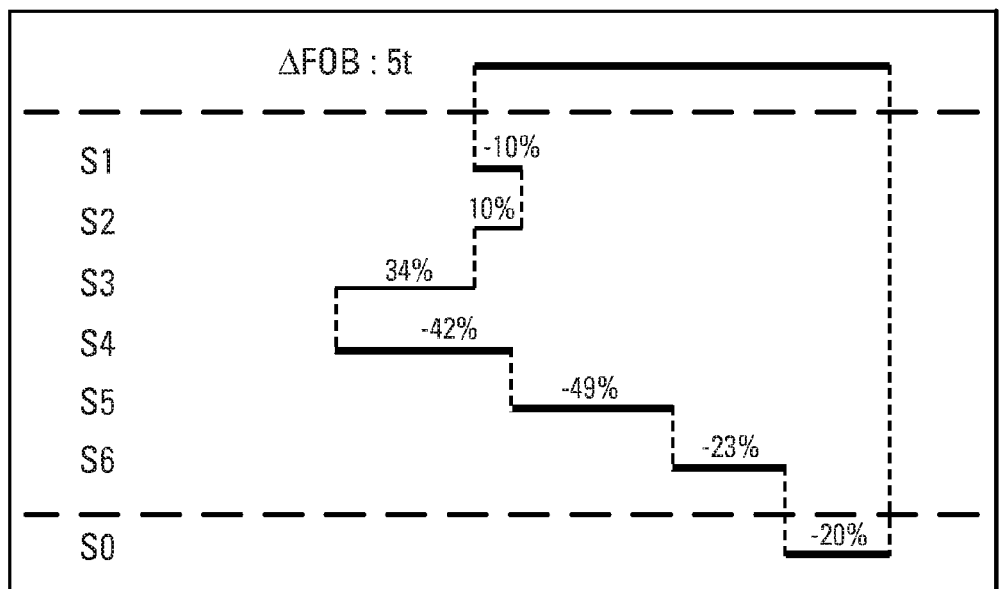
FIGS. 2 and 3 illustrate two examples of display relating to a preferred embodiment able to be implemented by a device in accordance with the invention.

Thus, the % FOB$_{xxx}$ provide the crew with a ratio representative of each consumption entry, as represented in FIG. 2. This FIG. 2 shows an exemplary display able to be carried out by the display means 5 on the screen 6. In this FIG. 2 have been represented:

the deviation $\Delta FOB$ which represents five tonnes ("5 t") in this example;
the various known sources S1 to S6 and an unknown source S0; and their relative weights (expressed as a percentage) in the total overconsumption of five tonnes. For example, an overconsumption of 10% ("−10%" on the display) for S1 and an under-consumption of 34% ("34%" on the display) for S3.

In this case, the sources S1 to S6 can correspond respectively to a performance degradation ($\Delta FOB_{pert}$), to a route modification ($\Delta FOB_{lat}$), to an altitude modification ($\Delta FOB_{alt}$), to a speed modification ($\Delta FOB_{spd}$), to the wind ($\Delta FOB_{wind}$) and to the temperature ($\Delta FOB_{temp}$);

B/ $\Delta FOB$ exhibits a zero, or very low, value.

In this case:
either all the $\Delta FOB_{xxx}$ are low, in which case the means 15 indicate to the crew that the mission is progressing in accordance with the reference mission;
or the $\Delta FOB_{xxx}$ compensate one another, and the means 15 then isolate the sources of gain and loss of fuel on the basis of the previously computed contributions of each source ($\Delta FOB_{spd}$, $\Delta FOB_{temp}$, $\Delta FOB_{alt}$, $\Delta FOB_{wind}$, $\Delta FOB_{lat}$ and $\Delta FOB_{pert}$). Thereafter, they compute the ratio between the fuel deviation estimated for each source ($\Delta FOB_{xxx}$) and the sum of the deviations of like effect, gain or loss rather than the total sum, as represented in FIG. 3.

Figure 3:
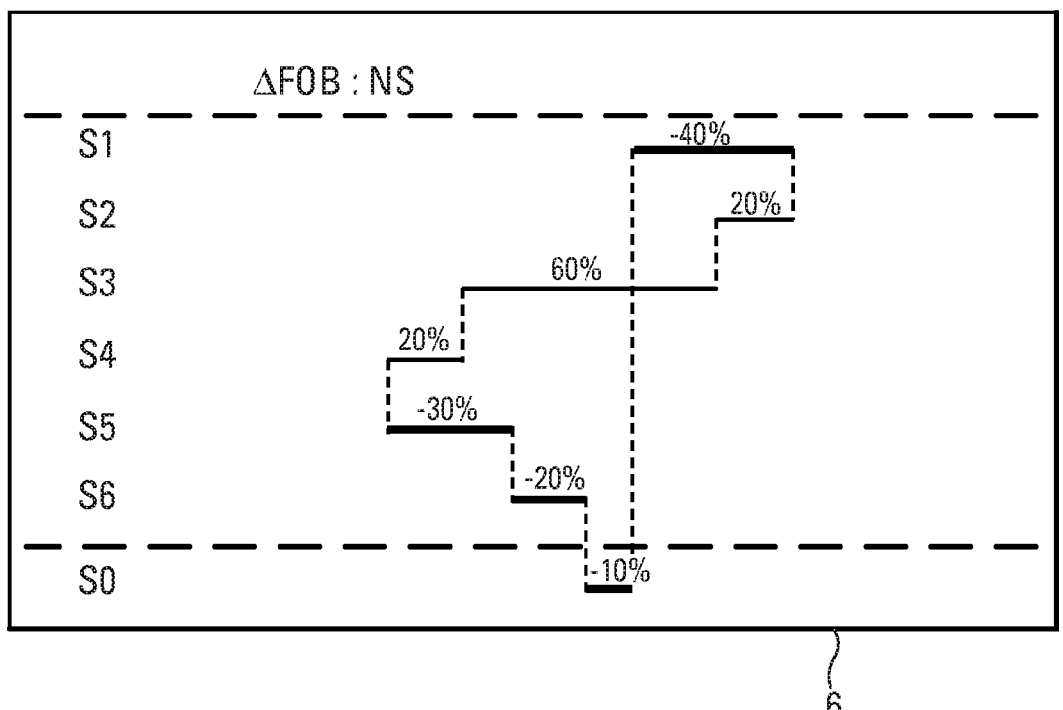

FIG. 3 corresponds to a display similar to that of FIG. 2, for $\Delta FOB$ exhibiting a zero value. The various overconsumption and under-consumption generated by the sources S1 to S6 and S0 compensate one another in this example so that $\Delta FOB$ exhibits a non-significant value ("NS") close to zero.

Thus, whatever the value of $\Delta FOB$, the set of deviations (even zero deviations) is presented by the display means 5 to aid the crew to understand the causes of the drift of the objectives of the mission.

The aforementioned processings which are applied to the fuel consumption can be adapted to other flight parameters, and in particular to the transit time at a given point. In this case, the device 1 also computes the deviations of the flight parameter considered with respect to the reference flight plan, for a plurality of flight data representing different origins, and it presents the set of said deviations on the screen 6, each time indicating the corresponding origin.

The device 1 can simultaneously display several graphics so as to allow the crew to compare the evolution of several parameters and thus be able to correlate a particular event on a given parameter with the evolution of one or more other parameters.

Figure 4:
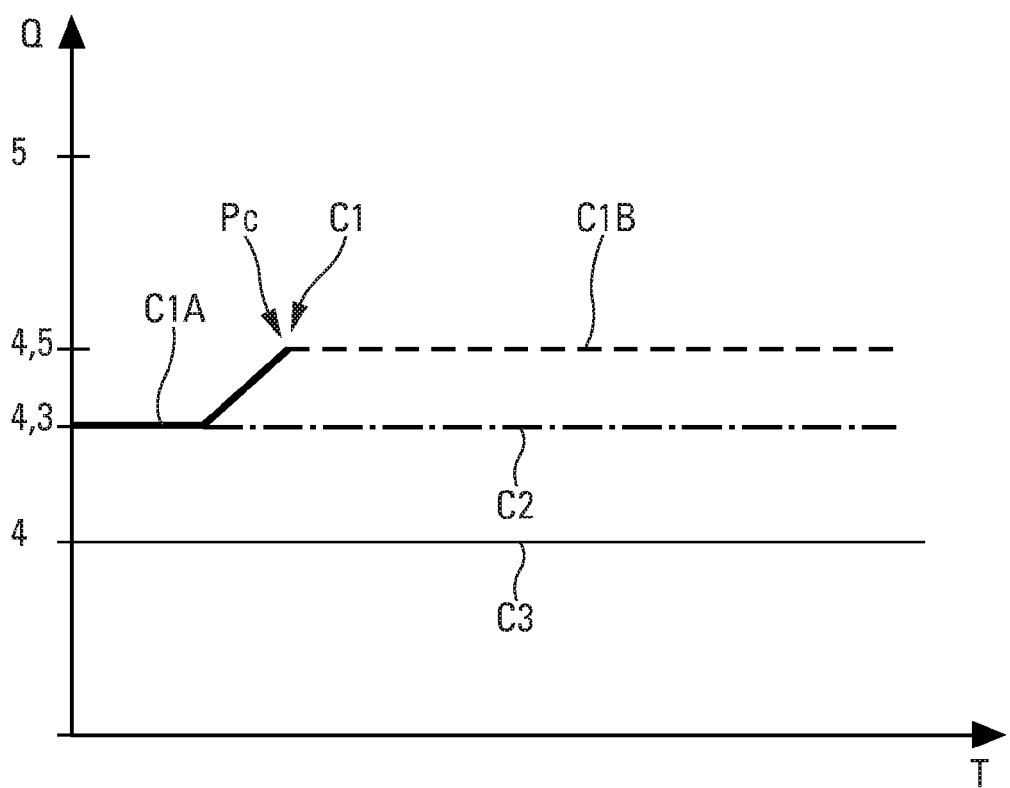
FIG. 4 illustrates an exemplary display of evolutions of a flight parameter.

In a preferred embodiment, each graphic shows, as represented by way of illustration in FIG. 4, simultaneously the following evolutions of one and the same flight parameter Q (for example the quantity of fuel at destination, expressed in tonnes), as a function of the time T (expressed for example in minutes):
along the active flight plan, as represented by a curve C1, firstly the actual evolution (highlighted by a thick continuous line C1A) up to the current position Pc, and then onward of this current position Pc the predicted evolution (highlighted by a broken-line plot C1B); and
the evolution along the reference flight plan, as represented by a curve C2, chain-dotted,
as well as at least one limit of said flight parameter, as represented by a curve C3, thin continuous line.

In this case, the means 5 can also display the evolution (not represented) of said flight parameter along an alternative flight plan.

The crew have, moreover, a possibility of configuring the presentation of the graphics (in particular with the aid of the means 8) so as to display the evolution of the parameters:
as a function of time;
as a function of distance; or
relation to the identifiers of the points of the flight plan.

The device 1 makes it possible to compile and to display several types of graphics, automatically or on the request of a pilot (via the means 8). The parameters represented are, in a non-exclusive manner:
the estimation of the quantity of fuel at destination;
the estimation of the time of arrival at destination;
the quantity of fuel aboard;
the sum of the quantity of fuel consumed and of that available aboard;
a performance factor;
the distance to destination;
the altitude;
the speed;
the wind; and
the temperature.

For each aforementioned parameter, and depending on their availability, the information envisaged in the reference flight plan, that envisaged by the flight management system and that measured in the course of the flight by the various onboard sensors, is superimposed.

Other relevant information, originating from diverse systems (computation modules, information input by the crew), can also be superimposed, depending on the type of parameter represented. By way of example may be cited:
the minimum quantity of fuel specified by the crew at destination, for the representation of the estimation of fuel at destination; and
the maximum altitudes reachable by the aircraft having regard to its current and future performance, for an altitude representation.

Provision may also be made, in a particular embodiment, for the device 1 to display certain curves in an automatic manner when the instantaneous or extrapolated value of a parameter attains a limit defined by the crew or by default.

Consequently, the hereinabove described device 1 in accordance with the invention makes it possible to provide the crew with various means for tracking its mission through the analysis of the evolution of flight parameters such as the fuel at destination, the wind, the temperature, the altitude, etc. The evolution of these parameters is continually compared with that of a reference mission. This reference can be updated in flight to take account of significant changes over the mission.

Moreover, the present invention provides the crew with the means for analyzing a possible straying of the fuel consumption by identifying the causes of this straying and the relative influence of each cause in the straying observed.

To achieve these objectives, the device 1 therefore comprises various functionalities making it possible in particular:
to compare the flight plan prepared on the ground and the flight plan input into the flight management system. This automatic comparison makes it possible to validate the flight plan used to guide the aircraft with respect to that of the reference mission. Moreover, in the case of considerable modifications of the initial flight plan, the device 1 updates the reference flight plan with the current predictions of the new flight plan so as to allow the crew to continue the mission tracking with respect to this new reference;
to summarize for the crew, in real time, all the useful information so as to aid them to perform their mission tracking task and to detect a straying with respect to the objectives of quantity of fuel and of time of arrival at destination of the reference mission. The invention thus allows a comparison between:

the active flight plan;
the reference flight plan serving as basis of comparison;
an alternative flight plan; and
the parameters recorded in the course of the flight (and therefore actually encountered during the flight up to the current position);

to automatically alert the crew as soon as a drift in consumption or time occurs between the current flight plan and the reference flight plan;

to automatically identify the possible cause or causes of this straying (by using the aircraft behavior model and the parameters actually encountered since the start of the mission) and the relative contribution of each cause to the observed straying; and to provide a compared viewing of an active flight plan with an alternative flight plan (in addition to the reference flight plan) in such a way as to evaluate the impact of a modification of the flight plan on the objectives of the mission.

The invention claimed is:

1. A method for assisting the mission tracking of an aircraft performed during a flight of said aircraft following a reference flight plan, the steps of the method are performed automatically and comprise:

measuring actual values of various types of flight data each relating to said aircraft during the flight as actually flown;

calculating an actual value of a flight performance condition representing the performance of the aircraft based on an actual flight path of the aircraft to a current flight location and one or more of the actual values of the various types of flight data;

calculating a predicted value of the flight performance condition based on the reference flight path to the current flight location and the one or more of the actual values of the various types of flight data;

calculating a deviation in the flight performance condition based on a difference between the actual value of the condition and the predicted value;

for each of a plurality of flight parameters each affecting the flight performance condition representing the performance of the aircraft:

calculating an actual value of the flight parameter based on the actual flight path of the aircraft to the current flight location, and one or more of the actual values of the various types of flight data;

determining a predicted value of the flight parameter based on the reference flight path to the current flight location;

calculating a deviation in the flight parameter based on a difference between the actual value of the flight parameter and the predicted value, and computing a relative contribution to the deviation in the flight performance condition due to the deviation in the flight parameter, wherein the relative contribution is relative to the relative contributions of the other deviations in the flight parameters; and presenting the relative contributions of the deviations of the flight parameters on a display screen in a flight deck of the aircraft, wherein the relative contributions are presented simultaneously on the display screen.

2. The method as claimed in claim 1, wherein said flight performance condition represents at least one of the following:
a quantity of fuel at a given point; and
a transit time at a given point.

3. The method as claimed in claim 1, wherein said flight parameters comprise at least one of the following:
speed of the aircraft;
wind speed of the atmosphere proximate to the aircraft;
air temperature of the atmosphere proximate to the aircraft;
altitude of the aircraft; and
the actual flight path of the aircraft.

4. The method as claimed in claim 1, wherein the flight performance condition represents a measured quantity of fuel in or consumed by the aircraft and the method further comprising:

calculating an actual quantity of fuel remaining in or consumed by the aircraft flying the actual flight path to the current flight location, wherein the calculation accounts for an evolution of a performance factor of the aircraft during the flight and external atmospheric conditions actually encountered by the aircraft during the flight;

calculating a predicted quantity of fuel remaining in or consumed by the aircraft flying the reference flight plan to the current flight location, wherein the calculation accounts for the evolution of a performance factor of the aircraft during the flight and the external atmospheric conditions actually encountered by the aircraft during the flight; and the calculation of the deviation in the flight condition is based on a difference between the actual quantity of fuel and the predicted quantity of fuel.

5. The method as claimed claim 1, further comprising automatically comparing an input initial flight plan entered before or at the start of the flight to a stored reference flight plan.

6. The method as claimed in claim 1 further comprising automatically substituting a current flight plan for the reference flight plan when a certain condition is fulfilled and thereafter using the current flight plan as the reference flight plan.

7. The method as claimed in claim 1, further comprising emitting at least one alert message, when at least one deviation of the flight parameters exceeds a threshold value.

8. The method as claimed in claim 1, wherein at least one graphic is displayed, and the graphic presents historical values of one of the flight parameters during the mission, wherein the graphic presents:

actual values of the flight parameter wherein each actual value corresponds to a position of the aircraft on the flight plan up to and including the current position, and predicted values of the flight parameter wherein each predicted value corresponds to a position along the flight plan beyond the current position.

9. The method as claimed in claim 8, wherein another graphic is display showing values of the flight parameter along an alternative flight plan.

10. The method as claimed in claim 8, wherein several graphics each relating to a different one of the flight parameters are displayed on said screen simultaneously.

11. A device for assisting the mission tracking of an aircraft, said device comprising:

means for retrieving and processing a reference flight plan relating to a reference mission for the aircraft;

means for calculating an actual value of a flight performance condition representing the performance of the aircraft based on an actual flight path of the aircraft to a current flight location and one or more of the actual values of the various types of flight data; calculating a predicted value of the flight performance condition based on the reference flight path to the current flight location and the one or more of the actual values of the various types of flight data; and calculating a deviation in the flight performance condition based on a difference between the actual value of the condition and the predicted value;

means for calculating actual values of flight parameters relating to the aircraft, wherein the calculations are made during a flight of said aircraft;

means for calculating, for each of the flight parameters, a deviation of said flight parameter with respect to the calculated actual value of the flight parameter and a predicted value of the flight parameter computed by estimating the value of the flight parameter based on the aircraft following the reference flight plan, and calculating relative contribution to the deviation in the flight performance condition due to the deviations for each of the flight parameters, and a display screen on a flight deck of the aircraft configured to simultaneously display the relative contributions to the deviation of the flight condition.

12. The device as claimed in claim 11, which further comprises:
means for retrieving and processing an active flight plan and an alternative flight plan; and
means for retrieving and processing data of computation modules.

13. An aircraft, which comprises a device such as that specified under claim 11.

14. A method to assist a flight crew to track a flight parameter of an aircraft with respect to a reference flight plan, the method comprising:

collecting actual values for various types of flight parameters while the aircraft is in flight, wherein the types of flight parameters includes aircraft speed, wind, temperature, aircraft altitude and actual aircraft flight route;

measuring an actual value of fuel consumption of the aircraft corresponding to a certain position of the aircraft along the actual aircraft flight route;

computing a predicted value for the fuel consumption by estimating performance of the aircraft along the reference flight plan to the certain position and using the collected values for the flight parameters;

computing a fuel consumption difference between the predicted value and the actual value of the fuel consumption;

for each of the flight parameters, calculating a deviation value by determining a difference between the actual value of the flight parameter and a predicted value of the flight parameter;

computing relative contribution values to the fuel consumption difference for each of the flight parameters based on the deviation values for each of the flight parameters, and presenting the relative contribution values simultaneously on a display in the flight deck of the aircraft, wherein the presentation indicates a relative contribution of each of the flight parameters to the fuel consumption difference.

* * * * *